(12) United States Patent
Ji et al.

(10) Patent No.: US 11,207,669 B2
(45) Date of Patent: Dec. 28, 2021

(54) ALUMINA SUPPORTER MATERIAL AND PREPARATION METHOD THEREOF, HYDROGENATION CATALYST AND RESIDUAL OIL HYDROGENATION PROCESSING

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Honghai Ji, Liaoning (CN); Huicheng Zhang, Liaoning (CN); Fengxiang Ling, Liaoning (CN); Shaojun Wang, Liaoning (CN); Zhiqi Shen, Liaoning (CN); Weiya Yang, Liaoning (CN); Lihua Wang, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(*) Notice: Subject to any disclaimer, the term of this patent is extended or adjusted under 35 U.S.C. 154(b) by 0 days.

(21) Appl. No.: 16/759,709

(22) PCT Filed: Oct. 26, 2018

(86) PCT No.: PCT/CN2018/112071
§ 371 (c)(1),
(2) Date: Apr. 27, 2020

(87) PCT Pub. No.: WO2019/080921
PCT Pub. Date: May 2, 2019

(65) Prior Publication Data
US 2020/0338529 A1    Oct. 29, 2020

(30) Foreign Application Priority Data

Oct. 27, 2017    (CN) .......................... 201711020561.8

(51) Int. Cl.
*B01J 37/02*    (2006.01)
*B01J 21/04*    (2006.01)
(Continued)

(52) U.S. Cl.
CPC ........... *B01J 37/0207* (2013.01); *B01J 21/04* (2013.01); *B01J 23/883* (2013.01); *B01J 35/026* (2013.01);
(Continued)

(58) Field of Classification Search
CPC ........ B01J 21/04; B01J 23/883; B01J 35/026; B01J 35/10; B01J 35/1019; B01J 35/1042;
(Continued)

(56) References Cited

U.S. PATENT DOCUMENTS 4,001,144 A    1/1977    Pearson et al.
4,102,822 A    7/1978    Mulaskey
(Continued)

FOREIGN PATENT DOCUMENTS

CN    1068975 A    2/1993
CN    1184078 A    6/1998
(Continued)

OTHER PUBLICATIONS

Machine Translation of Iga et al (JP 63147820 A) published Jun. 20, 1988.*

*Primary Examiner* — Brian A McCaig
(74) *Attorney, Agent, or Firm* — Novick, Kim & Lee, PLLC; Allen Xue

(57) ABSTRACT

The supporter material for catalyst includes a main body alumina and a rod-shaped alumina. The main body alumina
(Continued)

is provided with micron-sized pore channels, at least part of the rod-shaped alumina is distributed on the exterior surface of the main body alumina and/or in the micron-sized pore channels with a pore diameter D within a range of 3-10 μm; the rod-shaped alumina has a length of 1-12 μm and a diameter of 80-300 nm. The alumina supporter material is used as a residual oil hydrogenation catalyst supporter to facilitate a long period operation of the residual oil hydrogenation, and has high demetalization rate, desulfurization rate and denitrification rate.

20 Claims, 2 Drawing Sheets

(51) Int. Cl.
*B01J 35/02* (2006.01)
*B01J 35/10* (2006.01)
*B01J 37/00* (2006.01)
*B01J 37/08* (2006.01)
*B01J 23/883* (2006.01)

(52) U.S. Cl.
CPC .......... *B01J 35/10* (2013.01); *B01J 35/1019* (2013.01); *B01J 35/1042* (2013.01); *B01J 35/1066* (2013.01); *B01J 37/00* (2013.01); *B01J 37/0018* (2013.01); *B01J 37/0217* (2013.01); *B01J 37/0236* (2013.01); *B01J 37/08* (2013.01)

(58) Field of Classification Search
CPC .... B01J 35/1066; B01J 37/00; B01J 37/0018; B01J 37/0207; B01J 37/0217; B01J 37/0236; C10G 45/08; C10G 45/60; C10G 45/68; C10G 50/00
See application file for complete search history.

(56) References Cited

U.S. PATENT DOCUMENTS

| | | | |
|---|---|---|---|
| 4,448,896 A | 5/1984 | Kageyama et al. | |
| 4,499,203 A | 2/1985 | Dupin et al. | |
| 5,210,063 A | 5/1993 | Chopin et al. | |
| 6,207,611 B1 * | 3/2001 | Sun | B01J 21/04 423/625 |

FOREIGN PATENT DOCUMENTS

| | | |
|---|---|---|
| CN | 1107102 C | 4/2003 |
| CN | 1205314 C | 6/2005 |
| CN | 101890372 A | 11/2010 |
| CN | 101890375 A | 11/2010 |
| CN | 102861617 A | 1/2013 |
| CN | 103055949 B | 7/2014 |
| CN | 104108722 B | 6/2016 |
| CN | 106268969 A | 1/2017 |
| CN | 107303485 A | 10/2017 |
| CN | 108311130 A | 7/2018 |
| GB | 1468648 A | 3/1977 |
| RU | 2132231 C1 | 6/1999 |
| RU | 2271248 C1 | 3/2006 |
| RU | 2340607 C2 | 12/2008 |
| RU | 2414297 C2 | 3/2011 |

* cited by examiner

ALUMINA SUPPORTER MATERIAL AND PREPARATION METHOD THEREOF, HYDROGENATION CATALYST AND RESIDUAL OIL HYDROGENATION PROCESSING

FIELD

The present disclosure relates to the technical field of residual oil hydrogenation catalysts, particularly relates to an alumina supporter material for residual oil hydrogenation treatment and a preparation method thereof, a hydrogenation catalyst containing the supporter material and a residual oil hydrogenation processing using the hydrogenation catalyst.

BACKGROUND

The hydrogenation treatment is still the most important means of producing high-quality, environmentally friendly petroleum products at present. The core of the hydrotreating technology is the catalyst, when the heavy components of petroleum, such as vacuum gas oil (VGO), especially residual oil, are subjected to hydrogenation treatment, the pore diameter and the pore volume of the catalyst directly influence the activity performance of the catalyst.

The through-hole channel structure is very important for petroleum catalysts, in particular, the residual oil macromolecules need large through-hole channel for performing metal deposition, such that the catalyst achieves the maximum metal capacity, and the service cycle of the catalyst is extended. The metal molecules contained in the residual oil exist in the form of colloid and asphaltene macromolecules, both of which have the molecular weight about 2000, and the formed micelle has a size about 10 nm. When the diameter ratio of the reactant to the channel is 2-6 times, it is most beneficial to diffusion and reaction, and the channel diameter within a range of 10-100 nm is most effective for removing metal impurities from the residual oil. It is a necessary condition for long-term operation to keep sufficient amount of through-hole channels having a diameter of 10 nm-100 nm from the surface to the center during a period starting from an operation of the residual oil hydrogenation demetallization catalyst to its failure, so as to allow diffusion of the residual oil macromolecules and deposition of the metals.

The supporter material used by the residual oil hydrogenation treatment catalyst is generally macroporous alumina and modified products thereof. The commonly used preparation method of the macroporous alumina may be physical pore-forming method, high-temperature roasting method and pH value swing method. The physical pore-forming method has the disadvantages of non-uniform pore channels which are prone to be blocked.

U.S. Pat. Nos. 4,448,896 and 4,102,822 disclose the use of physical pore-expanding agent such as carbon black, starch in an amount of 10 wt % or more of alumina, mixed and kneaded with a powder of activated alumina or a precursor of activated alumina to enlarge the pore size of the alumina supporter, the physical pore-expanding agent is used in an amount more than 10% by weight of alumina. The method is characterized in that a physical pore-expanding agent is added into a precursor of alumina, and the used amount of the pore-expanding agent is large, so that the pores of alumina are dispersed, a portion of the large pores cannot form the continuous through-hole channels, and the pore channels are in an ink bottle shape, and have a small pore opening and poor strength.

CN1184078A discloses a process of preparing an alumina supporter. The process adopts aluminum hydroxide generated from colloid in co-current flow as seed crystal, then utilizes a pH value swing method to prepare the aluminum hydroxide, subsequently carries out extrusion molding to obtain alumina, wherein the volume of pores having a pore diameter within a range of 10-30 nm or 20-60 nm account for 70% or more of the total pore volume. When alumina is formed by a pH swing method, the strength and the pore size of a supporter are influenced by two factors, namely the acid dissolved in colloid and the pressure, and the reduced strength is derived from insufficient acid dissolved in colloid or lacking enough pressure, otherwise the pore size and the pore volume will be reduced. The pH swing method causes that the alumina powder has large pore channels among particles, which is derived from the pH swing, a plurality of pore channels having a diameter of 20-60 nm are constructed among the particles; however, when the acid dissolved in colloid is utilized, the pore channels among particles are dissolved and disconnected, the pore channels will be reconstructed under the action of pressure, but the pore diameter and the pore volume of the pore channels are sharply reduced, thus the pore volume and the strength are significantly contradictory.

CN1068975A discloses a method for preparing supporter of low density, large void content and high intensity alumina, which is obtained by adding a gelatinizer into alumina sol obtained by acid treatment and performing oil column forming, wherein the supporter of alumina has a specific surface area of 120-280 m$^2$/g, a stack density of 0.18-0.35 g/cm$^3$, a pore volume of 1.5-2.0 cm$^3$/g, an average pore diameter of 30-60 nm, and the crush strength of 0.5-3.0 kgf/grain, and the alumina supporter is used as catalyst for long chain alkane dehydrogenation. According to the method, hexamethylenetetramine is added into aluminum sol as a gelatinizer, which forms holes and windows in the aluminum sol, the holes are separated by the aluminum sol, the arrangement of the holes is in accordance with a ball packing theory, adjacent holes are communicated by means of windows, the pore channel formed in a ball packing and stacking mode have an ink bottle structure, it has a small pore opening and is not conducive to the diffusion of macromolecules. On the other hand, the oil column forming process has the disadvantages such as poor operation conditions, low production efficiency.

CN1107102C discloses a demetalating and desulfurizing hydrocatalyst and preparation process thereof, the preparation process adopts a hole expanding method by adding carbon black and regulates acidity of the supporter by adding boron. The supporter prepared with the process has a double-peak structure, the first peak has a size concentrated at about 10 nm, the second peak is a pore channel left after burning of the carbon black and has a size concentrated within a range of 200 nm-500 nm, most of the pore channels left after burning of the carbon black are ink bottle openings, this kind of pore channel does not facilitate removal of residual oil asphaltene micelle.

CN1205314C discloses a process for preparing demetallizing and desulfurizing catalyst of heavy oil hydrogenation, wherein the supporter for alumina is a composite of two materials, one of the two materials is alumina powder roasted at a high temperature of 1100° C. The process can form more pore channels with a diameter more than 15 nm, and the pore channels have penetrability, but the pore channels are too small for asphaltene micelle, the small size is not conducive to the demetallization reaction of the residual oil.

Therefore, for the sake of producing preferable effect of residual oil hydrogenation, the existing residual oil hydrogenation catalyst needs to be improved.

SUMMARY

The present disclosure aims to solve the problem that the existing residual oil hydrogenation catalyst has poor performance in demetallization, desulfurization and denitrification effects during a long period, and provides an alumina supporter material and a preparation method thereof, a hydrogenation catalyst and a residual oil hydrogenation processing. The alumina supporter material is used for the residual oil hydrogenation catalyst, can provide the characteristics of desirable macromolecule diffusion performance, strong impurity tolerance capacity, excellent stability of activity, and is suitable for residual oil hydrogenation treatment process.

In order to fulfill the above purposes, in a first aspect, the present disclosure provides an alumina supporter material, wherein the supporter material comprises a main body alumina and a rod-shaped alumina; the main body alumina is provided with micron-sized pore channels, at least part of the rod-shaped alumina is distributed on the exterior surface of the main body alumina and/or in the micron-sized pore channels with a pore diameter D within a range of 3-10 μm; the rod-shaped alumina has a length of 1-12 μm and a diameter of 80-300 nm.

Preferably, the length of the rod-shaped alumina distributed in the micron-sized pore channel is mainly 0.3 D-0.9 D; the length of the rod-shaped alumina distributed on the exterior surface of the main body alumina is primarily 3-8 μm.

Preferably, the supporter material has a specific surface area of 140-350 m$^2$/g, a pore volume of 0.6-1.5 mL/g, and a crush strength of 9-22 N/mm.

Preferably, the pore distribution of the supporter material is as follows: the sum of the pore volumes of pores with a pore diameter below 10 nm accounts for less than 15% of the total pore volume, the sum of the pore volumes of pores with a pore diameter more than 10 nm and less than 35 nm accounts for 30%-75% of the total pore volume, the sum of the pore volumes of pores with a pore diameter of 100-800 nm accounts for 10%-45% of the total pore volume, and the sum of the pore volumes of pores with a pore diameter more than 1000 nm is less than 26% of the total pore volume.

Preferably, the coverage rate of the rod-shaped alumina in the micron-sized pore channels of the main body alumina is within a range of 70-95%; the coverage rate of the rod-shaped alumina on the exterior surface of the main body alumina is within a range of 70-95%.

Preferably, 95% or more by mass of the rod-shaped alumina is distributed in the exterior surface of the main body alumina and/or the micron-sized pores having a pore diameter D within a range of 3-10 μm.

Preferably, the mass of the rod-shaped alumina accounts for 5-26% by mass of the supporter material.

Preferably, the supporter material further comprises an additive, and the additive is at least one selected from the group consisting of phosphorus, boron and silicon; the content of the additive in the supporter material is 10% by mass or less, preferably 0.1-10% by mass, in terms of oxide.

In a second aspect, the present disclosure provides a method of preparing an alumina supporter material of the present disclosure, the method comprises the following steps:

(1) preparing an alumina supporter intermediate;
(2) immersing the supporter intermediate into an ammonium bicarbonate solution, then carrying out sealing and heat treatment; subjecting the material obtained by the heat treatment to a first drying and a first roasting to produce the alumina supporter material.

Preferably, step (1) comprises mixing, kneading and molding an alumina precursor and a physical pore-expanding agent, subjecting the molded product to a secondary drying and a secondary roasting to produce an alumina supporter intermediate; wherein the physical pore-expanding agent is at least one selected from the group consisting of activated carbon, charcoal and wood chips, and the addition amount of the physical pore-expanding agent is 7-36% by mass of the alumina precursor calculated by $Al_2O_3$; the conditions of the second drying and the second roasting are as follows: the second drying temperature is within a range of 100-160° C., and the second drying time is 6-10 h; the second roasting temperature is within a range of 600-750° C., and the second roasting time is 4-6 h.

Preferably, the alumina supporter intermediate further comprises an additive, and the content of the additive in the alumina supporter intermediate is 10% by mass or less, preferably 0.1-10% by mass, in terms of oxide.

Preferably, the preparation in step (1) comprises the following steps: after adsorbing the additive-containing solution with a physical pore-expanding agent, mixing, kneading and molding the physical pore-expanding agent with the alumina precursor, drying and roasting the molded product to obtain an alumina supporter intermediate; wherein the dosage of the additive-containing solution is 30-50% by mass of the saturated water absorption capacity of the physical pore-expanding agent.

It is preferable in the step (2) that the mass ratio of the ammonium bicarbonate solution to the alumina supporter intermediate is 3:1-10:1, and the mass concentration of the ammonium bicarbonate solution is 10-25% by mass.

Preferably, the sealing and heat treatment in step (2) include: heating from the room temperature to the heat treatment temperature T=110-170° C. at a temperature rise velocity v of 5-20° C./min, then performing heat treatment at a constant temperature for 4-8 h.

Preferably, the sealing and heat treatment comprise: heating from the room temperature to a pretreatment temperature T1=60-100° C. at a temperature rise velocity v1 of 10-20° C./min, then carrying out pretreatment at a constant temperature for 2-4 h; further heating from the pretreatment temperature T1 to a heat treatment temperature T=110-170° C. at a temperature rise velocity of 5-10° C./min, then performing heat treatment at a constant temperature for 4-8 h; in addition, v2 is at least 3° C./min, preferably at least 5° C./min, lower than v1.

It is preferable in step (2) that the first drying temperature is within a range of 100-160° C., and the first drying time is 6-10 h; the first roasting temperature is within a range of 600-750° C., and the first roasting time is 4-6 h.

Preferably, the supporter intermediate has a specific surface area within a range of 120-240 m$^2$/g and a pore volume of 0.7-1.4 mL/g; the pore distribution of the supporter intermediate is as follows: the sum of the pore volumes of the pores with a pore diameter of 10-35 nm accounts for 20-70% of the total pore volume, the sum of the pore volumes of the pores with a pore diameter of 100-800 nm accounts for 5-20% of the total pore volume, and the sum of the pore volumes of the pores with a pore diameter of 3 μm or more accounts for 3-20% of the total pore volume.

In a third aspect, the present disclosure provides a use of the alumina supporter material in the present disclosure as a supporter in a catalyst; preferably, the catalyst comprises a hydrogenation catalyst, a high polymer polymerization catalyst, a dehydrogenation catalyst, an oxidation reaction catalyst, an aromatization catalyst, an isomerization catalyst, an alkylation catalyst, a reforming catalysis catalyst and an etherification catalyst.

In a fourth aspect, the present disclosure provides a hydrogenation catalyst comprising an active metal component and an alumina supporter material of the present disclosure.

In a fifth aspect, the present disclosure provides a residual oil hydrogenation processing, which comprises contacting residual oil with a catalyst to perform hydrogenation reaction, wherein the catalyst comprises the hydrogenation catalyst of the present disclosure.

Through the aforementioned technical solution, the supporter material provided by the present disclosure takes full advantages of the micron-scale pore channels of the main body alumina, the rod-shaped alumina is randomly distributed in the micron-scale pore channels in a mutually staggered manner, such that on one hand, the penetrability of the micron-scale pore channels can be maintained, the specific surface area of the supporter is improved, and the mechanical strength is enhanced; on the other hand, it can perform a certain hole expanding effect on the nanometer-scale pore channels of the main body alumina, and further improve the penetrability and uniformity of the nanometer-scale pore channels. In such a way, it can overcome the problem that the large aperture, the specific surface area and the mechanical strength brought by a physical pore-expanding agent cannot be obtained simultaneously.

In the method for preparing the supporter material provided by the present disclosure, the adopted steps can promote the exterior surface of the main body alumina supporter and the inner surface of the micron-sized pore channel to be covered with the rod-shaped alumina with uniform diameter and length.

In the method for preparing the supporter material provided by the present disclosure, it is further preferably that the additive-containing solution is adsorbed by the physical pore-expanding agent, and then the pseudo-boehmite and the physical pore-expanding agent adsorbed with the additive are mixed, kneaded and molded, so as to facilitate the additive to be intensively distributed in the micron-sized pore channels, and impose a modification function on the produced rod-shaped alumina, improve the action of the active component and the supporter, thereby enhance activity of the catalyst, particularly the desulfurization and denitrification activities of the catalyst.

When the alumina supporter material provided by the present disclosure is used for preparing a hydrogenation catalyst for carrying out residual oil hydrogenation, a fixed bed reactor is used, wherein the grading mode of the catalysts in different reaction zones can still achieve very high demetallization rate, desulfurization rate and denitrification rate under the condition of long-period operation.

DESCRIPTION OF THE REFERENCE SIGNS

Figure 1:
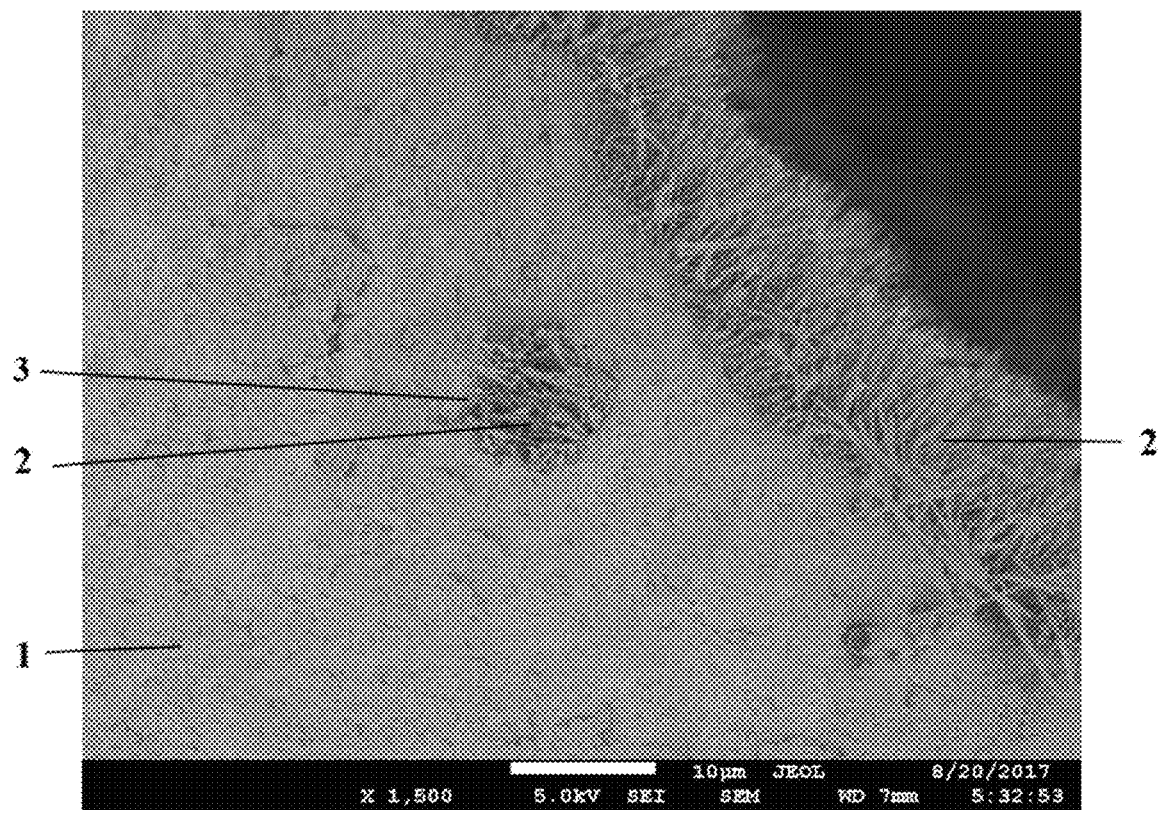
FIG. 1 is a Scanning Electron Microscope (SEM) photograph of a cut surface of an alumina supporter material obtained in Example 1.

1—main body alumina; 2—rod-shaped alumina; 3—micron-sized pore channel

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides an alumina supporter material, wherein the supporter material comprises a main body alumina and a rod-shaped alumina, the main body alumina is provided with micron-sized pore channels, at least part of the rod-shaped alumina is distributed on the exterior surface of the main body alumina and/or in the micron-sized pore channels with a pore diameter D within a range of 3-10 μm; the rod-shaped alumina has a length of 1-12 μm and a diameter of 80-300 nm.

According to the present disclosure, the morphology of the rod-shaped alumina may be conducive to improve the supporter characteristics of the alumina supporter material. Preferably, the length of the rod-shaped alumina distributed in the micron-sized channels is mainly 0.3 D-0.9 D, the length is 0.3-0.9 times of the diameter D of the micron-sized pore channels, and the length of the rod-shaped alumina in the micron-sized channels, which is about 85% by mass or more, is within a range of 0.3 D-0.9 D. Preferably, the length of the rod-shaped alumina distributed on the exterior surface of the main body alumina is primarily 3-8 μm, and the length of about 85% by mass or more of the rod-shaped alumina on the exterior surface is within a range of 3-8 μm.

According to the present disclosure, an alumina supporter material having the aforementioned characteristics can be provided to improve supporter characteristics. Preferably, the supporter material has a specific surface area of 140-350 $m^2/g$, a pore volume of 0.6-1.5 mL/g, and a crush strength of 9-22 N/mm.

According to the present disclosure, an alumina supporter material is provided with an improved pore structure. Preferably, the pore distribution of the supporter material is as follows: the sum of the pore volumes of pores with a pore diameter below 10 nm accounts for less than 15% of the total pore volume, the sum of the pore volumes of pores with a pore diameter more than 10 nm and less than 35 nm accounts for 30%-75% of the total pore volume, the sum of the pore volumes of pores with a pore diameter of 100-800 nm accounts for 10%-45% of the total pore volume, and the sum of the pore volumes of pores with a pore diameter more than 1000 nm is less than 26% of the total pore volume.

According to the present disclosure, the rod-shaped alumina and the main body alumina are preferably connected in the micron-sized pore channels in a manner that at least one end of at least a portion of the rod-shaped alumina is attached to the walls of the micron-sized pore channels, and preferably at least a portion of the rod-shaped alumina is integrated with the main body alumina in the micron-sized pore channels.

According to the present disclosure, the rod-shaped alumina and the main body alumina are preferably connected on the exterior surface in a manner that on the exterior surface of the main body alumina, an end of at least portion of the rod-shaped alumina is attached to the exterior surface of the main body alumina, and preferably, on the exterior surface of the main body alumina, at least portion of the rod-shaped alumina is integrated with the main body alumina, another end of the rod-shaped alumina extends outwards.

According to the present disclosure, the rod-shaped alumina may cover the main body alumina. Preferably, the coverage rate of the rod-shaped alumina in the micron-sized pore channels of the main body alumina is within a range of 70-95%; the coverage herein may refer to the percentage of the surface in the interior surface of the micron-sized pore channels of the main body alumina that are occupied by rod-shaped alumina accounts for an interior surface of the main body micron-sized pore channels. Preferably, the coverage rate of the rod-shaped alumina on the exterior surface of the main body alumina is within a range of 70-95%; the coverage rate herein may refer to the percentage of the surface in the exterior surface of the main body alumina that are occupied by rod-shaped alumina accounts for an exterior surface of the main body alumina.

According to the present disclosure, it is preferable that the rod-shaped alumina is randomly distributed in the supporter material in a mutually staggered manner; the pore diameter of the pores formed among the rod-shaped alumina is within the range of 100-800 nm. The pore structure and surface characteristics of the alumina supporter material can be improved.

According to the present disclosure, the provided alumina supporter material has the alumina with the two morphologies mentioned above and the distribution characteristics, so that the better supporter characteristics can be provided, and the pore diameter, the specific surface area and the mechanical strength are considered. The rod-shaped alumina is present in the alumina supporter material predominantly in a covering manner. Preferably, 95% by mass or more of the rod-shaped alumina is distributed in the exterior surface of the main body alumina and/or the micron-sized pore channels having a pore diameter D within a range of 3-10 μm. Preferably, 97% by mass or more of the rod-shaped alumina is distributed in the exterior surface of the main body alumina and/or the micron-sized pore channels having a pore diameter D within a range of 3-10 μm.

According to the present disclosure, the alumina supporter material as a whole is mainly composed of the main body alumina. Preferably, the mass of the rod-shaped alumina accounts for 5-26% by mass of the supporter material. The obtained alumina supporter material within the content range can be used for residual oil hydrogenation catalysts to improve the reaction performance.

According to the present disclosure, an additive-containing alumina supporter material can be further provided on the basis of the supporter material. Preferably, the supporter material further comprises an additive, and the additive is at least one selected from the group consisting of phosphorus, boron and silicon; the content of the additive in the supporter material is 10% by mass or less, preferably 0.1-10% by mass, in terms of oxide.

In the present disclosure, it is more preferable that the additive is distributed in the micron-sized pore channels of the main body alumina. Furthermore, the content of the additive in the supporter material is 3% by mass or less, preferably 0.3-3% by mass, and more preferably 0.5-2% by mass in terms of oxide. The distribution and content of the additive in the main body alumina can be detected by a scanning electron microscope-energy dispersive spectrometer (SEM-EDS).

In a second aspect, the present disclosure provides a method of preparing an alumina supporter material of the present disclosure, the method comprises the following steps:

(1) preparing an alumina supporter intermediate;

(2) immersing the supporter intermediate into an ammonium bicarbonate solution, then carrying out sealing and heat treatment; subjecting the material obtained by the heat treatment to a first drying and a first roasting to produce an alumina supporter material.

According to the present disclosure, step (1) preferably comprises: mixing, kneading and molding an alumina precursor and a physical pore-expanding agent, subjecting the molded product to a secondary drying and a secondary roasting to produce an alumina supporter intermediate; wherein the physical pore-expanding agent is at least one selected from the group consisting of activated carbon, charcoal and wood chips. The particle size of the physical pore-expanding agent is selected according to micron-sized pore channels of the supporter intermediate, wherein the particle size of the physical pore-expanding agent is preferably about 3-10 μm. Preferably, the addition amount of the physical pore-expanding agent is 7-36% by mass of the alumina precursor calculated by $Al_2O_3$. The alumina precursor may be a substance capable of forming alumina after subjecting to the first roasting in step (2), such as at least one of the group consisting of pseudo-boehmite, hydrated alumina, alumina sol, and amorphous aluminum hydroxide.

In the present disclosure, the mixing, kneading and molding can be carried out by adopting a conventional method in the technical field; moreover, a conventional molding additive, such as one or more of a peptizing agent, an extrusion additive, can be added during the molding process according to the practical requirements. The peptizing agent is at least one of the group consisting of hydrochloric acid, nitric acid, sulfuric acid, acetic acid and oxalic acid, and the extrusion additive may be a substance which is beneficial to extrusion forming, such as sesbania powder. The conditions of the second drying and the second roasting are as follows: the second drying temperature is within a range of 100-160° C., and the second drying time is 6-10 h; the second roasting temperature is within a range of 600-750° C., and the second roasting time is 4-6 h. The roasting may be performed in an oxygen-containing atmosphere, preferably an air atmosphere.

According to the present disclosure, an additive may be added in step (1). Preferably, the alumina supporter intermediate further comprises an additive, and the content of the additive in the alumina supporter intermediate is 10% by mass or less, preferably 0.1-10% by mass, in terms of oxide. Furthermore, the additive is distributed in the micron-sized pore channels, and the content of said additive in the supporter is 3% by mass or less, preferably 0.3-3% by mass, and more preferably 0.5-2% by mass, in terms of oxide.

According to the present disclosure, the additive may be distributed in the micron-sized pore channels by using the following method. Preferably, the preparation in step (1) comprises the following steps: after adsorbing the additive-containing solution with a physical pore-expanding agent, mixing, kneading and molding the physical pore-expanding agent with the alumina precursor, subjecting the molded product to a second drying and a second roasting to obtain an alumina supporter intermediate; wherein the dosage of the additive-containing solution is 30-50% by mass of the saturated water absorption capacity of the physical pore-expanding agent. In the present disclosure, the additive may be at least one of the group consisting of a phosphorus source, a boron source, and a silicon source. When the additive-containing solution is prepared, for example, the phosphorus source in use may be phosphoric acid or phosphate, and the phosphate can be ammonium hydrogen phosphate and/or diammonium hydrogen phosphate; the boron source in use may be boric acid or borate, and the borate can be ammonium borate; the silicon source in use may be ethanol solution containing silicate ester, wherein the silicate ester is at least one selected from the group consisting of methyl orthosilicate, ethyl orthosilicate and butyl orthosilicate.

According to the present disclosure, step (2) of the provided method may be used for molding said alumina supporter intermediate into an alumina supporter material. It is preferable in the step (2) that the mass ratio of the ammonium bicarbonate solution to the alumina supporter intermediate is 3:1-10:1, and the mass concentration of the ammonium bicarbonate solution is 10-25% by mass.

According to the present disclosure, the sealing and heat treatment in step (2) comprise: heating from the room temperature to the heat treatment temperature T=110-170° C. at a temperature rise velocity v of 5-20° C./min, then performing heat treatment at a constant temperature for 4-8 h. The sealing and heat treatment is generally carried out in a high-pressure reaction kettle.

According to the present disclosure, the sealing and heat treatment comprise: heating from the room temperature to a pretreatment temperature T1=60-100° C. at a temperature rise velocity v1 of 10-20° C./min, then carrying out pretreatment at a constant temperature for 2-4 h; further heating from the pretreatment temperature T1 to a heat treatment temperature T=110-170° C. at a temperature rise velocity of 5-10° C./min, then performing heat treatment at a constant temperature for 4-8 h; in addition, v2 is at least 3° C./min, preferably at least 5° C./min, lower than v1.

According to the present disclosure, in step (2), the first drying temperature is within a range of 100-160° C., and the first drying time is 6-10 h; the first roasting temperature is within a range of 600-750° C., and the first roasting time is 4-6 h.

According to the present disclosure, the definition concerning a pore structure of the alumina supporter intermediate may be more conducive to obtain the alumina supporter material provided by the present disclosure. Preferably, the supporter intermediate according to step (1) has the following properties: the specific surface area is within a range of 120-240 m$^2$/g, and the pore volume is 0.7-1.4 mL/g; the pore distribution is as follows: the sum of the pore volumes of the pores with a pore diameter of 10-35 nm accounts for 20-70% of the total pore volume, the sum of the pore volumes of the pores with a pore diameter of 100-800 nm accounts for 5-20% of the total pore volume, and the sum of the pore volumes of the pores with a pore diameter of 3 μm or more accounts for 3-20% of the total pore volume.

In the method provided by the present disclosure, compared with the alumina supporter intermediate, the alumina supporter material obtained in step (2) has more concentrated distribution of the pores having the pore diameter within the ranges of 10-35 nm and 100-800 nm.

In a third aspect, the present disclosure provides an application of the alumina supporter material in the present disclosure as a supporter in catalysts; preferably, the catalysts comprise a hydrogenation catalyst, a high polymer polymerization catalyst, a dehydrogenation catalyst, an oxidation reaction catalyst, an aromatization catalyst, an isomerization catalyst, an alkylation catalyst, a reforming catalysis catalyst and an etherification catalyst.

In a fourth aspect, the present disclosure provides a hydrogenation catalyst comprising an active metal component and the alumina supporter material of the present disclosure.

According to the present disclosure, the active metal component may be a metal providing hydrogenation reactivity. Preferably, the active metal component is a group VIB metal and/or a group VIII metal; preferably, the group VIB metal is selected from Mo and/or W, and the group VIII metal is selected from Co and/or Ni.

According to the present disclosure, it is preferable that the content of the active metal component is 2.3-28% by mass in terms of metal oxide based on the mass of the hydrogenation catalyst; preferably, the content of the group VIB metal in terms of metal oxide is 2-20% by mass; the content of the group VIII metal in terms of metal oxide is 0.3-8% by mass.

In the present disclosure, the hydrogenation catalyst can be prepared with a conventional method such as an impregnation method, a kneading method, preferably an impregnation method. The process of the impregnation method may be as follows: subjecting the alumina supporter material to a spray impregnation, a saturated impregnation or a super-saturated impregnation by adopting a solution containing a precursor of the active metal component; then carrying out drying and roasting to produce the hydrogenation catalyst of the present disclosure. The drying can be performed at the temperature of 100-130° C. for 1-5 h; the roasting may be performed at the temperature of 400-550° C. for 2-10 h.

The hydrogenation catalyst provided by the present disclosure can be used as a hydrogenation protection catalyst, a hydrogenation demetallization catalyst, a hydrogenation desulfurization catalyst, a hydrodenitrogenation catalyst, a hydroconversion catalyst and the like, it is particularly suitable for reaction processes containing macromolecular reactant or product, such as the residual oil hydrogenation treatment process.

In a fifth aspect, the present disclosure provides a residual oil hydrogenation method, the method comprises contacting residual oil with a catalyst to perform hydrogenation reaction, wherein the catalyst comprises the hydrogenation catalyst of the present disclosure.

In the present disclosure, the hydrogenation reaction can be carried out in a fixed bed reactor, and the catalyst can be filled in the fixed bed reactor to form a catalyst bed layer. The catalyst bed layer may consist of a variety of catalysts including the hydrogenation catalyst of the present disclosure. Preferably, the fixed bed reactor may be divided into different reaction zones, wherein at least one reactor may be charged with a catalyst comprising the hydrogenation catalyst of the present disclosure, and the catalysts in each zone may be different.

In the present disclosure, it is preferable that the fixed bed reactor may at least comprise a hydrogenation protection reaction zone, a hydrogenation demetallization reaction zone, a hydrogenation desulfurization and denitrification reaction zone according to a sequence from a reaction material inlet to a product outlet. The catalysts filled in each reaction zone may be a hydrogenation protection catalyst, a hydrogenation demetalization catalyst, a hydrogenation desulfurization and denitrification catalyst. More preferably, the hydrogenation protection catalyst, the hydrogenation demetallization catalyst and the hydrogenation desulfurization and denitrification catalyst all contain the oxide supporter material which is provided by the present disclosure and contains or does not contain the additive as a supporter, and the contents of rod-shaped alumina contained in the supporters of the hydrogenation protection catalyst, the hydrogenation demetallization catalyst and the hydrogenation desulfurization and denitrification catalyst may be different.

In the specific embodiment of the residual oil hydrogenation method provided by the present disclosure, the content of the rod-shaped alumina in the contained supporter may be reduced sequentially according to the grading mode of filling the catalysts, namely from the hydrogenation protection catalyst to the hydrogenation demetallization catalyst to the hydrogenation desulfurization and denitrification catalyst.

In the present disclosure, the mass of the rod-shaped alumina preferably accounts for 16-26% by mass of the supporter contained in the hydrogenation protection catalyst. The amount of the rod-shaped alumina may be 16 mass %, 17 mass %, 18 mass %, 19 mass %, 20 mass %, 21 mass %, 22 mass %, 23 mass %, 24 mass %, 25 mass %, 26 mass %, or a range between the above numerical values.

In the present disclosure, the mass of the rod-shaped alumina preferably accounts for 5-15% by mass of the supporter contained in the hydrogenation protection catalyst. The amount of the rod-shaped alumina may be 5 mass %, 6 mass %, 7 mass %, 8 mass %, 9 mass %, 10 mass %, 11 mass %, 12 mass %, 13 mass %, 14 mass %, 15 mass %, or a range between the above numerical values.

In the present disclosure, the mass of the rod-shaped alumina preferably accounts for 5-14% by mass of the supporter contained in the hydrogenation protection catalyst. The amount of the rod-shaped alumina may be 5 mass %, 6 mass %, 7 mass %, 8 mass %, 9 mass %, 10 mass %, 11 mass %, 12 mass %, 13 mass %, 14 mass %, or a range between the above numerical values.

In the present disclosure, it is preferable that the loading volume ratio of the catalysts in the hydrogenation protection reaction zone, the hydrogenation demetallization reaction zone and the hydrogenation desulfurization and denitrification reaction zone is 1:(1-2):(4-6).

In the present disclosure, it is preferable that a hydrogenation desulfurization reaction zone and a hydrogenation denitrification reaction zone are respectively arranged in the hydrogenation desulfurization and denitrification reaction zone, wherein a hydrogenation desulfurization catalyst and a hydrogenation denitrification catalyst may be respectively filled in the corresponding zone; wherein the volume ratio of the catalyst filled in the hydrogenation desulfurization reaction zone to the catalyst filled in the hydrogenation denitrogenation reaction zone is (2-3):(2-3).

In the specific embodiment of the residue oil hydrogenation method provided by the present disclosure, the grading mode of the catalysts may be preferably that the contents of the active metals are different among the hydrogenation protection catalyst, the hydrogenation demetallization catalyst, the hydrogenation desulfurization and denitrification catalyst. Preferably, the contents of the active metal component contained in the catalysts sequentially increases from the hydrogenation protection catalyst to the hydrogenation demetallization catalyst to the hydrodesulfurization and denitrification catalyst.

In the present disclosure, it is preferable that the content of the active metal component in the hydrogenation protection catalyst is 2.3-10% by mass in terms of the metal oxide.

In the present disclosure, it is preferable that the content of the active metal component in the hydrogenation demetallization catalyst is 8-18% by mass in terms of the metal oxide.

In the present disclosure, it is preferable that the content of the active metal component in the hydrogenation desulfurization and denitrogenation catalyst is 10-28% by mass in terms of the metal oxide. Further preferably, the content of the active metal component in the hydrogenation desulfurization catalyst is 10-25% by mass, and the content of the active metal component in the hydrogenation denitrogenation catalyst is 10-28% by mass.

In the specific embodiment of the residue oil hydrogenation method provided by the present disclosure, the grading mode of the catalysts may be preferably that the alumina supporter material provided by the present disclosure and contained in the hydrogenation protection catalyst and the hydrogenation demetallization catalyst does not contain an additive; the alumina supporter material provided by the present disclosure and contained in the hydrogenation desulfurization catalyst comprises phosphorus and/or boron, wherein the phosphorus and/or boron are distributed in micron-sized pore channels of the main body alumina of the alumina supporter provided by the present disclosure, and the content of the phosphorus and/or boron in the supporter is 0.5-2% by mass in terms of oxides; the alumina supporter material provided by the present disclosure and contained in the hydrogenation denitrogenation catalyst comprises silicon, wherein the silicon is distributed in micron-sized pore channels of main body alumina of the alumina supporter provided by the present disclosure, and the content of the silicon in the supporter is 0.5-2% by mass in terms of oxide.

In the present disclosure, it is preferable that the conditions of the hydrogenation reaction comprise: the reaction temperature is within a range of 370-410° C., the partial pressure of hydrogen is 12-18 MPa, the liquid hourly space velocity (LHSV) is 0.1-1.5 h$^{-1}$, and the hydrogen-oil volume ratio is 500-2000:1.

The present disclosure will be described in detail below with reference to the examples.

In the following Examples and Comparative Examples, the pore structure of the supporter is characterized by physical adsorption-desorption of $N_2$, the specific operations are as follows: the structure of the sample pore is characterized by adopting an ASAP-2420 type $N_2$ physical adsorption-desorption instrument. A small amount of sample is taken and subjected to a vacuum treatment at a temperature of 300° C. for 3-4 h, and the product is finally placed under the conditions of liquid nitrogen and low temperature (−200° C.) to carry out nitrogen absorption-desorption test. Wherein the specific surface area is calculated according to a BET (Brunauer, Emmett and Teller) equation, and the distribution rate of the pore volume and the pore diameter below 40 nm is obtained according to a BJH (Barret, Joyner, Halenda) model.

The pore diameter distribution of the supporter is characterized by adopting a mercury porosimetry, and the specific operations are as follows: the distribution of sample pores is characterized by adopting an AutoPore 9500 full-automatic mercury porosimetry manufactured by Micromeritics Instrument Corporation in the United States of America (USA). The samples are dried, weighed and placed into a dilatometer, and degassed for 30 minutes while maintaining the vacuum condition given by the instrument, and mercury is charged. The dilatometer is then placed in the high pressure kettle and vented, then subjects to the voltage boosting and reducing tests. The mercury contact angle is 130°, the mercury interfacial tension is 0.485 N·cm$^{-1}$, and the distribution rate of the pore diameter more than 100 nm is measured with a mercury porosimeter.

The microstructure of the alumina supporter material is characterized by adopting a scanning electron microscope (SEM), and the specific operations are as follows: the microstructure of the supporter is characterized by adopting a JSM-7500F scanning electron microscope, wherein the accelerating voltage is 5 KV, the accelerating current is 20 μA, and the working distance is 8 mm.

The V+Ni removal rate, the desulfurization rate and the denitrification rate are calculated according to the following formulas:

V+Ni removal rate %=(content of metals Ni+V in the raw oil−content of metals Ni+V in the product)/content of metals Ni+V in the raw oil× 100%

Desulfurization rate %=(sulfur content in the raw oil−sulfur content in the product)/sulfur content in the raw oil×100%

Denitrogenation rate %=nitrogen content in the raw oil−nitrogen content in the product)/nitrogen content in the raw oil×100%

Example 1

260 g of pseudo-boehmite dry glue powder (produced by Wenzhou Jingjing Alumina Co., Ltd.), 60 g of active carbon with a particle size of 8 μm and 8 g of sesbania powder were weighted, the materials were uniformly mixed, an appropriate amount of acetic acid aqueous solution with a mass concentration of 1.5% was added, the mixture was subjected to mixing, kneading, extruding into strips and molding, the molded products were dried at a temperature of 100° C. for 6 h, and the dried products were roasted in an air atmosphere and at a temperature of 700° C. for 5 h to obtain an alumina supporter intermediate ZA1.

100 g of the alumina supporter intermediate ZA1 was weighted, and placed in 800 g of ammonium bicarbonate solution, wherein the ammonium bicarbonate solution was an aqueous solution with a mass concentration of 20%, then the mixture was transferred into a high-pressure kettle for sealing, the mixture was heated to 100° C. at a temperature rise velocity of 15° C./min and kept a constant temperature for 3 h, the mixture was further heated to 150° C. at a temperature rise velocity of 10° C./min and kept a constant temperature for 6 h, the supporter was subsequently dried at a temperature of 100° C. for 6 h, and subjected to roasting at a temperature of 700° C. for 5 h to produce the alumina supporter material A1, the properties of the alumina supporter material A1 were shown in Table 1.

The alumina supporter material A1 under the scanning electron microscope observation was as shown in FIG. 1, wherein the length of the rod-shaped alumina in the micron-sized pore channel was mainly 2.5-7.0 μm, the length of the rod-shaped alumina on the exterior surface of the main body alumina was mainly 3-8 μm, the coverage rate of the rod-shaped alumina on the exterior surface of the main body alumina was about 85%, and the coverage rate of the rod-shaped alumina in the micron-sized pore channel of the main body alumina was about 81%; the diameters of pores randomly formed by the rod-shaped alumina in a mutually staggered manner were concentrated within a range of 400-700 nm. The mass of the rod-shaped alumina was 18% by mass of the alumina supporter material A1.

The supporter was impregnated in a solution containing active metal components Mo and Ni, then subjected to drying at a temperature of 120° C. for 5 h and roasting at a temperature of 450° C. for 6 h to obtain a hydrogenation protection catalyst C1, the properties of the catalyst were shown in Table 1.

Example 2

260 g of pseudo-boehmite dry glue powder (produced by Wenzhou Jingjing Alumina Co., Ltd.), 30 g of active carbon with a particle size of 10 μm and 8 g of sesbania powder were weighted, the materials were uniformly mixed, an appropriate amount of acetic acid aqueous solution with a mass concentration of 1.5% was added, the mixture was subjected to mixing, kneading, extruding into strips and molding, the molded products were dried at a temperature of 100° C. for 6 h, and the dried products were roasted in an air atmosphere and at a temperature of 700° C. for 5 h to obtain an alumina supporter intermediate ZA2.

100 g of the alumina supporter intermediate ZA2 was weighted, and placed in 600 g of ammonium bicarbonate solution, wherein the ammonium bicarbonate solution was an aqueous solution with a mass concentration of 18%, then the mixture was transferred into a high-pressure kettle for sealing, the mixture was heated to 100° C. at a temperature rise velocity of 15° C./min and kept a constant temperature for 3 h, the mixture was further heated to 140° C. at a temperature rise velocity of 10° C./min and kept a constant temperature for 6 h, the supporter was subsequently dried at a temperature of 100° C. for 6 h, and subjected to roasting at a temperature of 700° C. for 5 h to produce the alumina supporter material A2, the properties of the alumina supporter material A2 were shown in Table 1.

In the alumina supporter material A2, wherein the length of the rod-shaped alumina in the micron-sized pore channel was mainly 3.0-9.0 μm, the length of the rod-shaped alumina on the exterior surface of the main body alumina was mainly 3-8 μm, the coverage rate of the rod-shaped alumina on the exterior surface of the main body alumina was about 82%, and the coverage rate of the rod-shaped alumina in the micron-sized pore channel of the main body alumina was about 79%; the diameters of pores randomly formed by the rod-shaped alumina in a mutually staggered manner were concentrated within a range of 300-500 nm. The mass of the rod-shaped alumina was 12% by mass of the alumina supporter material A1.

The supporter was added into a solution containing active metal components Mo and Ni for impregnation for 2 h, the redundant solution was filtered, then subjected to drying at a temperature of 120° C. for 3 h and roasting at a temperature of 550° C. for 5 h to obtain a hydrogenation demetallization catalyst C2, the properties of the catalyst were shown in Table 1.

Example 3

25 g of activated carbon with a particle size of 6 μm was weighted, the activated carbon was subjected to spraying and impregnating by using 7.5 mL of ammonium hydrogen phosphate solution with a mass concentration of 28%, the sprayed and impregnated activated carbon was mixed with 260 g of pseudo-boehmite dry glue powder (produced by Wenzhou Jingjing Alumina Co., Ltd.) and 8 g of sesbania powder uniformly, an appropriate amount of acetic acid aqueous solution with a mass concentration of 1.5% was added, the mixture was subjected to mixing, kneading, extruding into strips and molding, the molded products were dried at a temperature of 100° C. for 6 h, and the dried products were roasted in an air atmosphere and at a temperature of 700° C. for 5 h to obtain an alumina supporter intermediate ZA3.

100 g of the alumina supporter intermediate ZA3 was weighted, and placed in 500 g of ammonium bicarbonate solution, wherein the ammonium bicarbonate solution was an aqueous solution with a mass concentration of 14%, then the mixture was transferred into a high-pressure kettle for sealing, the mixture was heated to 100° C. at a temperature rise velocity of 15° C./min and kept a constant temperature for 3 h, the mixture was further heated to 140° C. at a temperature rise velocity of 10° C./min and kept a constant temperature for 6 h, the supporter was subsequently dried at a temperature of 100° C. for 6 h, and subjected to roasting at a temperature of 700° C. for 5 h to produce the alumina supporter material A3, the properties of the alumina supporter material A3 were shown in Table 1.

The content of $P_2O_5$ in the alumina supporter material A3 is 1% by mass, the length of the rod-shaped alumina in the micron-sized pore channel was mainly 1.5-5.5 the length of the rod-shaped alumina on the exterior surface of the main body alumina was mainly 3-8 μm, the coverage rate of the rod-shaped alumina on the exterior surface of the main body alumina was about 85%, and the coverage rate of the rod-shaped alumina in the micron-sized pore channel of the main body alumina was about 80%; the diameters of pores randomly formed by the rod-shaped alumina in a mutually staggered manner were concentrated within a range of 100-400 nm. The mass of the rod-shaped alumina was 10% by mass of the alumina supporter material A1.

The supporter was impregnated in a solution containing active metal components Mo and Ni, then subjected to drying at a temperature of 120° C. for 4 h and roasting at a temperature of 550° C. for 5 h to obtain a hydrogenation protection catalyst C3, the properties of the catalyst were shown in Table 1.

Example 4

19 g of activated carbon with a particle size of 6 μm was weighted, the activated carbon was subjected to spraying and impregnating with 12 mL of ethanol solution of tetraethoxysilane (TEOS) containing 2.4 g of silicon dioxide, the sprayed and impregnated activated carbon was mixed with 260 g of pseudo-boehmite dry glue powder (produced by Wenzhou Jingjing Alumina Co., Ltd.) and 8 g of sesbania powder uniformly, an appropriate amount of acetic acid aqueous solution with a mass concentration of 1.5% was added, the mixture was subjected to mixing, kneading, extruding into strips and molding, the molded products were dried at a temperature of 100° C. for 6 h, and the dried products were roasted in an air atmosphere and at a temperature of 700° C. for 5 h to obtain an alumina supporter intermediate ZA4.

100 g of the alumina supporter intermediate ZA4 was weighted, and placed in 600 g of ammonium bicarbonate solution, wherein the ammonium bicarbonate solution was an aqueous solution with a mass concentration of 15%, then the mixture was transferred into a high-pressure kettle for sealing, the mixture was heated to 100° C. at a temperature rise velocity of 15° C./min and kept a constant temperature for 3 h, the mixture was further heated to 160° C. at a temperature rise velocity of 10° C./min and kept a constant temperature for 6 h, the supporter was subsequently dried at a temperature of 100° C. for 6 h, and subjected to roasting at a temperature of 700° C. for 5 h to produce the alumina supporter material A4, the properties of the alumina supporter material A4 were shown in Table 1.

Figure 2:
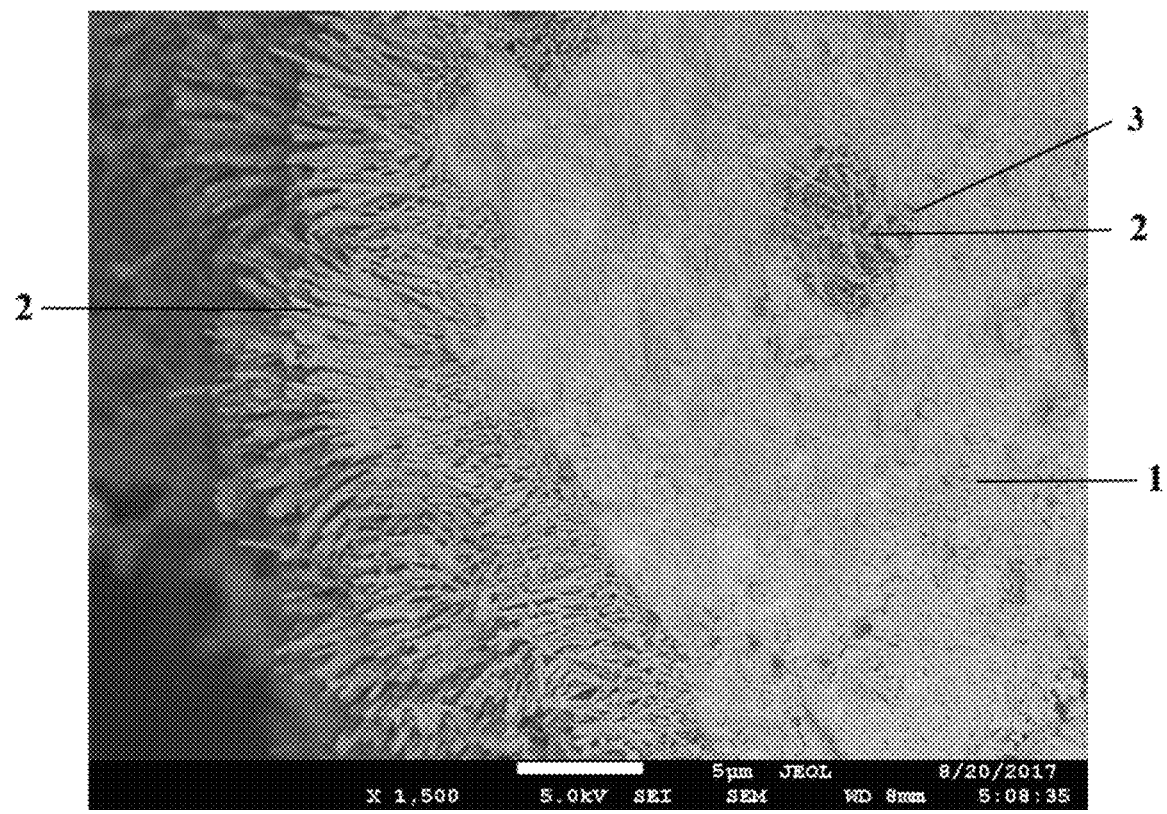
FIG. 2 is an SEM photograph of a cut surface of an alumina supporter material obtained in Example 4.

The content of $SiO_2$ in the alumina supporter material A4 was 1.2% by mass, as shown in an scanning electron microscope photograph FIG. 2, wherein the length of the rod-shaped alumina in the micron-sized pore channel was mainly 2.0-5.5 μm, the length of the rod-shaped alumina on the exterior surface of the main body alumina was mainly 3-8 μm, the coverage rate of the rod-shaped alumina on the exterior surface of the main body alumina was about 83%, and the coverage rate of the rod-shaped alumina in the micron-sized pore channel of the main body alumina was about 86%; the diameters of pores randomly formed by the rod-shaped alumina in a mutually staggered manner were concentrated within a range of 200-400 nm. The mass of the rod-shaped alumina was 8% by mass of the alumina supporter material A4.

The supporter was impregnated in a solution containing active metal components Mo and Ni, then subjected to drying at a temperature of 125° C. for 4 h and roasting at a temperature of 550° C. for 5 h to obtain a hydrogenation protection catalyst C4, the properties of the catalyst were shown in Table 1.

Comparative Example 1

The Comparative Example was performed according to the method of Example 2, except that the ammonium bicarbonate solution was replaced with an ammonium carbonate solution, thereby obtain an alumina supporter material A5 and a hydrogenation treatment catalyst C5. The properties of the alumina supporter material and the catalyst were shown in Table 1.

Comparative Example 2

The Comparative Example was performed according to the method of Example 3, except that the ammonium bicarbonate solution was replaced with a sodium bicarbonate solution, thereby obtain an alumina supporter material A6 and a hydrogenation treatment catalyst C6. The properties of the alumina supporter material and the catalyst are shown in Table 1.

TABLE 1

|  | Example 1 | | Example 2 | | Example 3 | | Example 4 | | Comparative Example 1 | |
| --- | --- | --- | --- | --- | --- | --- | --- | --- | --- | --- |
| Number | ZA1 | A1 | ZA2 | A2 | ZA3 | A3 | ZA4 | A4 | A5 | A6 |
| Specific surface area, m²/g | 175 | 198 | 181 | 193 | 189 | 203 | 179 | 213 | 171 | 179 |
| Pore volume, mL/g | 0.86 | 1.09 | 0.92 | 1.07 | 0.93 | 1.08 | 0.87 | 1.06 | 0.74 | 0.72 |
| Crush strength, N/mm | 11.0 | 12.9 | 11.1 | 13.1 | 10.8 | 13.5 | 11.6 | 12.6 | 9.4 | 9.8 |

TABLE 1-continued

|  | Example 1 | Example 2 | Example 3 | Example 4 | Comparative Example 1 | | | |
|---|---|---|---|---|---|---|---|---|
| Pore distribution v % | | | | | | | | |
| <10 nm | — | 4 | — | 8 | — | 11 | — | 12 | 36 | 29 |
| 10-35 nm | 32 | 38 | 41 | 50 | 46 | 53 | 48 | 57 | 35 | 35 |
| 100-800 nm | 21 | 35 | 6 | 24 | 12 | 23 | 9 | 20 | 10 | 18 |
| More than 1000 nm | — | 15 | — | 13 | — | 4 | — | 4 | — | — |
| 3 μm or more | 14 | — | 6 | — | 10 | — | 10 | — | 6 | 6 |
| Catalysts | | C1 | | C2 | | C3 | | C4 | C5 | C6 |
| MoO₃, mass % | — | 6.0 | — | 9.0 | — | 12.5 | — | 17.5 | 9.0 | 12.5 |
| NiO, mass % | — | 1.5 | | 3.0 | | 4.0 | | 6.0 | 3.0 | 4.0 |
| Ratio of the rod-shaped alumina*, mass % | | 18 | | 12 | | 10 | | 8 | | — |

*the mass content of the rod-shaped alumina in a supporter (the alumina supporter material provided by the present disclosure is used as a supporter in a catalyst).

Example 5

The catalysts C1, C2, C3 and C4 were assembled onto four catalyst bed layers of the fixed bed reactor from top to bottom respectively, the volume ratio of the assembled catalysts was 1:2:3:3, the treated raw materials (see Table 2) and the test conditions were as follows: the reaction temperature was 385° C., the hydrogen-oil volume ratio is 1000, the liquid hourly space velocity (LHSV) was 0.6 h$^{-1}$, and the partial pressure of hydrogen is 15 MPa. The operation was continuously performed for 3000 h, and the impurity removal property was shown in Table 3.

Example 6

The Example 6 was performed according to the method of Example 5, except that the volume ratio of the assembled catalysts was replaced with 1.0:1.7:2.5:3.0. The operation was continuously performed for 3000 h, and the impurity removal property was shown in Table 3.

Comparative Example 3

The Comparative Example 3 was performed according to the method of Example 5, except that the catalysts C1, C2, C3 and C4 were replaced with catalysts C1, C5, C6 and C4, respectively. The operation was continuously performed for 3000 h, and the impurity removal property was shown in Table 3.

TABLE 2

| Analysis items | Light atmospheric residue of Saudi Arabia |
|---|---|
| Density (20° C.), g/cm³ | 0.96 |
| Ni, μg/g | 22.4 |
| V, μg/g | 73.0 |
| S, mass % | 3.3 |
| N, mass % | 0.35 |
| CCR, mass % | 11.2 |

TABLE 3

|  | Example 5 | Example 6 | Comparative Example 3 |
|---|---|---|---|
| V + Ni removal rate, % | 89.7 | 90.2 | 74.3 |
| Desulfurization rate, % | 92.4 | 93.5 | 75.4 |
| Denitrification rate, % | 94.2 | 93.8 | 61.7 |

As can be seen from the results of the Examples, the Comparative Examples, Table 1 and Table 3, the alumina supporter material provided by the present disclosure can be produced with the preparation method examples provided by the present disclosure, the alumina supporter material is consisting of the main body alumina and the rod-shaped alumina, it has improved supporter characteristics, and better pore structure, surface characteristics and mechanical strength, such that the prepared hydrogenation catalyst can be applied to a residual oil hydrogenation method, and produces the optimized effects of demetalization, desulfurization and denitrification under an obviously improved long-period operation of residual oil hydrogenation.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. An alumina supporter material, comprising a main body alumina and a rod-shaped alumina; the main body alumina is provided with micron-sized pore channels, at least part of the rod-shaped alumina is distributed on the exterior surface of the main body alumina and/or in the micron-sized pore channels with a pore diameter D within a range of 3-10 μm; the rod-shaped alumina has a length of 1-12 μm and a diameter of 80-300 nm.

2. The supporter material of claim 1, wherein the length of the rod-shaped alumina distributed in the micron-sized pore channel is mainly 0.3 D-0.9 D; the length of the rod-shaped alumina distributed on the exterior surface of the main body alumina is primarily 3-8 μm.

3. The supporter material of claim 1, wherein the supporter material has a specific surface area of 140-350 m2/g, a pore volume of 0.6-1.5 mL/g, and a crush strength of 9-22 N/mm.

4. The supporter material of claim 1, wherein the pore distribution of the supporter material is as follows: the sum of the pore volumes of pores with a pore diameter below 10 nm accounts for less than 15% of the total pore volume, the sum of the pore volumes of pores with a pore diameter more than 10 nm and less than 35 nm accounts for 30%-75% of the total pore volume, the sum of the pore volumes of pores with a pore diameter of 100-800 nm accounts for 10%-45% of the total pore volume, and the sum of the pore volumes of pores with a pore diameter more than 1000 nm is less than 26% of the total pore volume.

5. The supporter material of claim 1, wherein in the micro-sized channels, at least one end of at least a portion of the rod-shaped alumina is attached to the walls of the micron-sized pore channels;
on the exterior surface of the main body alumina, an end of at least portion of the rod-shaped alumina is attached to the exterior surface of the main body alumina.

6. The supporter material of claim 1, wherein the coverage rate of the rod-shaped alumina in the micron-sized pore channels of the main body alumina is within a range of 70-95%; the coverage rate of the rod-shaped alumina on the exterior surface of the main body alumina is within a range of 70-95%.

7. The supporter material of claim 1, wherein the rod-shaped alumina is randomly distributed in the supporter material in a mutually staggered manner; the pore diameter of the pores formed among the rod-shaped alumina is within the range of 100-800 nm.

8. The supporter material of claim 1, wherein 95% or more by mass of the rod-shaped alumina is distributed on the exterior surface of the main body alumina and/or in the micron-sized pores having a pore diameter D within a range of 3-10 μm.

9. The supporter material of claim 1, wherein the mass of the rod-shaped alumina accounts for 5-26% by mass of the supporter material.

10. The supporter material of claim 1, wherein the supporter material further comprises an additive, and the additive is at least one selected from the group consisting of phosphorus, boron and silicon; the content of the additive in the supporter material is 10% by mass or less, in terms of oxide.

11. A method of preparing an alumina supporter material of claim 1, wherein comprising:
(1) preparing an alumina supporter intermediate;
(2) immersing the supporter intermediate into an ammonium bicarbonate solution, then carrying out sealing and heat treatment; subjecting the material obtained by the heat treatment to a first drying and a first roasting to produce the alumina supporter material.

12. The method of claim 11, wherein step (1) comprises mixing, kneading and molding an alumina precursor and a physical pore-expanding agent, subjecting the molded product to a secondary drying and a secondary roasting to produce an alumina supporter intermediate;
wherein the physical pore-expanding agent is at least one selected from the group consisting of activated carbon, charcoal and wood chips, and the addition amount of the physical pore-expanding agent is 7-36% by mass of the alumina precursor calculated by Al2O3;
the conditions of the second drying and the second roasting are as follows: the second drying temperature is within a range of 100-160° C., and the second drying time is 6-10 h; the second roasting temperature is within a range of 600-750° C., and the second roasting time is 4-6 h.

13. The method of claim 12, wherein the alumina supporter intermediate further comprises an additive, and the content of the additive in the alumina supporter intermediate is 10% by mass or less, in terms of oxide.

14. The method of claim 12, wherein the preparation in step (1) comprises the following steps: adsorbing an additive-containing solution with a physical pore-expanding agent, mixing, kneading and molding the physical pore-expanding agent with the alumina precursor, drying and roasting the molded product to obtain an alumina supporter intermediate; wherein the dosage of the additive-containing solution is 30-50% by mass of the saturated water absorption capacity of the physical pore-expanding agent.

15. The method of claim 11, wherein in step (2), the mass ratio of the ammonium bicarbonate solution to the alumina supporter intermediate is 3:1-10:1, and the mass concentration of the ammonium bicarbonate solution is 10-25% by mass.

16. The method of claim 11, wherein the sealing and heat treatment in step (2) comprise: heating from a room temperature to a heat treatment temperature T=110-170° C. at a temperature rise velocity v of 5-20°C./min, then performing heat treatment at a constant temperature for 4-8 h.

17. The method of claim 16, wherein the sealing and heat treatment comprise: heating from a room temperature to a pretreatment temperature T1=60-100° C. at a temperature rise velocity v1 of 10-20° C./min, then carrying out pretreatment at a constant temperature for 2-4 h; further heating from the pretreatment temperature T1 to a heat treatment temperature T=110-170° C. at a temperature rise velocity v2 of 5-10° C./min, then performing heat treatment at a constant temperature for 4-8h; in addition, v2 is at least 3° C./min, lower than v1.

18. The method of claim 11, wherein in step (2), the first drying temperature is within a range of 100-160° C., and the first drying time is 6-10 h; the first roasting temperature is within a range of 600-750° C., and the first roasting time is 4-6 h.

19. The method of claim 11, wherein the supporter intermediate has a specific surface area within a range of 120-240 m2/g and a pore volume of 0.7-1.4 mL/g; the pore distribution of the supporter intermediate is as follows: the sum of the pore volumes of the pores with a pore diameter of 10-35 nm accounts for 20-70% of the total pore volume, the sum of the pore volumes of the pores with a pore diameter of 100-800 nm accounts for 5-20% of the total pore volume, and the sum of the pore volumes of the pores with a pore diameter of 3 μm or more accounts for 3-20% of the total pore volume.

20. A catalyst, comprising the alumina supporter material of claim 1, wherein; the catalysts is a hydrogenation catalyst, a high polymer polymerization catalyst, a dehydrogenation catalyst, an oxidation reaction catalyst, an aromatization catalyst, an isomerization catalyst, an alkylation catalyst, a reforming catalysis catalyst or an etherification catalyst.

* * * * *